United States Patent [19]
Rowe

[11] Patent Number: 5,210,409
[45] Date of Patent: May 11, 1993

[54] APPARATUS AND METHOD FOR SENSING THE RELATIVE POSITION OF TWO MEMBERS EMPLOYING A VARIABLE WAVELENGTH SOURCE AND WAVELENGTH DEPENDANT SCANNER

[75] Inventor: Duncan P. Rowe, Chelmsford, United Kingdom

[73] Assignee: GEC-Marconi Limited, Stanmore, United Kingdom

[21] Appl. No.: 878,785

[22] Filed: May 6, 1992

[30] Foreign Application Priority Data

May 8, 1991 [GB] United Kingdom ............... 9109890

[51] Int. Cl.$^5$ ............................................. H04J 5/16
[52] U.S. Cl. ............................. 250/227.18; 250/226; 250/227.21; 250/227.23; 250/231.13; 250/237 G
[58] Field of Search .......... 250/231 B, 227.21, 227.18, 250/223.23, 226, 237 G

[56] References Cited

U.S. PATENT DOCUMENTS

| | | | |
|---|---|---|---|
| 3,514,617 | 5/1970 | Klyce | 250/227 |
| 4,740,688 | 4/1988 | Edwards | 250/226 |
| 4,746,792 | 5/1988 | Dil | 250/231.13 |
| 4,780,600 | 10/1988 | Johnston | 250/237 G |
| 4,849,624 | 7/1989 | Huggins | 250/226 |
| 5,068,528 | 11/1991 | Miller et al. | 250/231.13 |

FOREIGN PATENT DOCUMENTS

2120880 12/1983 United Kingdom.

OTHER PUBLICATIONS

S. R. Mallinson, "Fiber Coupled Fabry-Perot Wavelength Demultiplexer" Jan. 31, 1985, Whole Document pp. 121-122. vol. 21, No. 3.

*Primary Examiner*—David C. Nelms
*Assistant Examiner*—T. Davenport
*Attorney, Agent, or Firm*—Jacobson, Price, Holman & Stern

[57] ABSTRACT

The relative position (M) of two members (33, 34) is sensed by scanning (S) an optical beam (25) over an encoded pattern (20) carried by one of the members, and by using a read head (21) secured to the other member to receive an optical signal transmitted from the encoded pattern (20). This optical signal is received by an optical position sensor to discriminate from the frequency of the signal, the position of the read head (21) relative to the encoded pattern (20). As the relative position is detected from the frequency of the signal rather than its intensity, components can be replaced without recalibration. The optical beam (25) is scanned by using a light source of variable wavelength which is passed through a device, such as a diffraction grating or a gradient index lens, for deflecting the beam (25) dependent on its wavelength.

19 Claims, 5 Drawing Sheets

APPARATUS AND METHOD FOR SENSING THE RELATIVE POSITION OF TWO MEMBERS EMPLOYING A VARIABLE WAVELENGTH SOURCE AND WAVELENGTH DEPENDANT SCANNER

FIELD OF THE INVENTION

This invention relates to apparatus for sensing the relative position of two members and also to a method of sensing such relative position.

BACKGROUND OF THE ART

A conventional metal airframe construction provides a good Faraday cage that shields internal electronic equipment from electromagnetic fields. However the increasing use of composite materials in airframe construction has left internal electronic equipment vulnerable to electromagnetic fields and has necessitated either the provision of heavy protective sheathing for such electronic equipment in the vicinity of composite airframe sections, or the replacement of such vulnerable electronic equipment with equipment which is not susceptible to electromagnetic fields. The latter alternative has lead to the adoption of optical encoders for sensing relative linear or rotary positions, for instance, for monitoring the position of control surfaces. In addition to being immune to electromagnetic fields, the optical fibres require minimal protective sheathing and are much lighter than heavily sheathed electrical wiring.

U.S. Pat. No. 3,514,617 is concerned with a system for reading utility meters from a central location by means of a telephone circuit and particularly to an improved optical transducer for providing a signal indicative of a meter reading. More specifically it teaches that a utility meter pointer shaft should drive a plate having a reflective surface on which is drawn a pattern of non-reflective radial line segments that start from a reference angular position and have a continuously increasing angular spacing extending along a circumferential path. A cantilever is oscillated by the action of two electromagnets and carries two light pipes. The pattern is illuminated from a stationary light source through one of the light pipes, the vibration of the cantilever causing the free end of this light pipe to scan the transmitted light over a portion of the path on the reflective disc surface including a large number of the closely spaced radial line segments. A stationary photoresponsive device senses light reflected from the relative portions of the disc through the other light pipe. In this way a square wave signal is developed at an output of the photoresponsive device and has a fundamental frequency dependent upon the spacing of the nonreflective radial line segments and the vibrational speed of the cantilever. The fundamental frequency signal is then filtered out to provide a signal indicative of the position of the meter pointer shaft. Although this teaching enables the position of the utility meter pointer shaft to be sensed from a remote position, it inherently relies on a vibrating cantilever to scan the light over the pattern, and electromagnets to vibrate the cantilever. These features are clearly unsuitable for use in vehicles as the movement of the cantilever would be modulated by any sudden movement of the vehicle and would cause a false reading. In the case of an aircraft subject to sudden high loading, such modulation of the cantilever movement would cause a false reading at the very moment when an accurate indication is required, for instance, of one or more of the control surfaces. Furthermore there is also the danger that the cantilever vibration may be affected by the transmission of vibrations generated elsewhere in the airframe. The electromagnets vibrating the cantilever would cause an electromagnetic field within the airframe which, as already stated, is unacceptable.

Although the present invention is primarily concerned with optical encoders for use in avionics applications, such optical encoders are also suitable for other applications susceptible to electromagnetic radiation or where electrical sparks could be hazardous, and indeed could be used on machine tools or in any application requiring the sensing or measurement of the relative position of two members.

Many optical fibre sensor techniques have been demonstrated capable of measuring almost all measurands. Most of such techniques, especially for the measurement of linear and rotary position, are intensity based—that is the optical power is a function of the measurand. When any optical component of such an intensity based sensor system is replaced (e.g. the sensor head, the fibre link, or the electro-optics unit), recalibration of the system is necessary due to the variability of component and connector losses. The optical losses at each connector vary widely from as little as 0.1 decibel to as much as 2 decibels for a poor connection. It is for this reason that optical intensity based fibre optic sensors have not yet become a viable alternative to electrical sensors. Indeed, for applications in the avionics field, the cost and time delay required for such recalibration is unacceptable.

BRIEF DESCRIPTION OF THE INVENTION

An object of the present invention is to provide a method and apparatus for sensing the relative position of two members utilising an optical sensor technique which will permit the replacement of components without recalibration.

According to one aspect of the invention apparatus for sensing the relative position of two members includes an encoded pattern to be carried by one of the members, means for producing an optical beam of varying wavelength, scanning means for deflecting the beam dependent on its wavelength to scan over the encoded pattern, a readhead to be secured to the other member for receiving an optical signal transmitted from the encoded pattern, and an optical position sensor for receiving the optical signal from the readhead and for discriminating, from the frequency of the optical signal, the position of the readhead relative to the encoded pattern. The encoded pattern may be light-reflective and the readhead be positioned to receive the optical signal reflected by the pattern. Alternatively, the encoded pattern may be translucent and the readhead be positioned to receive the optical signal transmitted through the pattern.

The readhead preferably incorporates the scanning means. The scanning means preferably includes a diffraction grating for deflecting the beam dependent on its wavelength. The diffraction grating may either be arranged in the Littrow configuration, or be combined with a gradient index lens. The means for producing the optical beam of varying wavelength preferably includes a wideband light source governed by a variable wavelength filter. This variable wavelength filter is preferably a multiple beam interference device which may be a Fabry Perot etalon. The etalon may be piezoelectrically driven or may be a solid state device including a liquid crystal of which the refractive index can be varied.

The variable wavelength filter may be a rotating diffraction grating or may be an interference filter.

The scanning means is preferably arranged to move the optical beam sinusoidally.

The encoded pattern preferably varies in regular increments in the direction (or sense) of movement between the two members, and the scanning means is arranged to scan the optical beam transversley to such direction (or sense) of movement. The successive increments of the encoded pattern are preferably arranged to transmit optical signals of different frequency to the readhead. Such encoded pattern preferably includes an increment which is arranged to transmit a unique light signal to the readhead to serve as a reference point.

A second encoded pattern may be carried by said one member, means being provided for producing a second optical beam of varying wavelength, a second scanning means for deflecting the second beam dependent on its wavelength to scan over the second encoded pattern, and a second readhead being provided to be secured to the said other member, the two encoded patterns being different thereby assisting the optical position sensor to discriminate more finely the position of the readhead relative to the encoded patterns.

According to another aspect of the invention a method of sensing the relative position of two members includes providing an optical beam of variable wavelength, refracting the beam dependent on its wavelength to scan, from a fixed position relative to one of the members, over an encoded pattern carried by the other member to produce an optical signal, and detecting the portion of the encoded pattern over which the optical beam has been scanned by sensing the frequency of the optical signal. The method may additionally comprise passing a wideband light source through a variable wavelength filter to produce the optical beam of variable wavelength.

DETAILED DESCRIPTION

Figure 1:
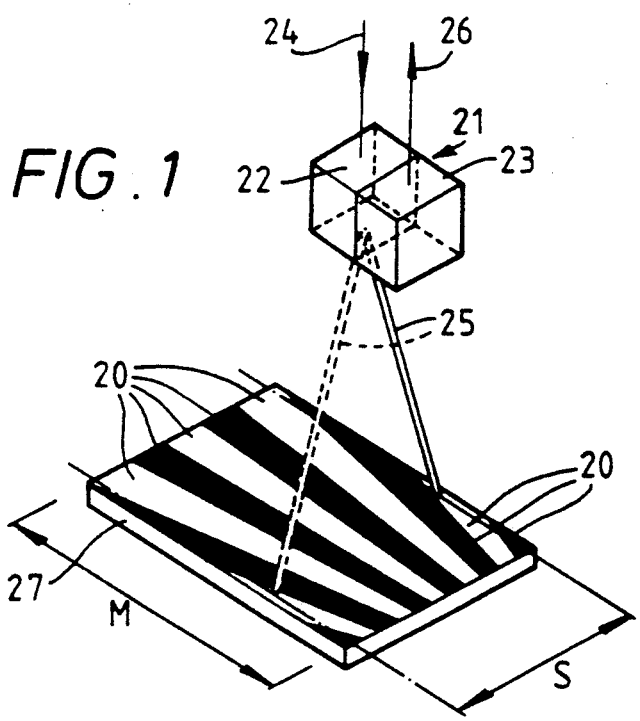
FIG. 1 is an isometric diagram illustrating the scanning of an optical beam across an encoded pattern.
Figure 4:
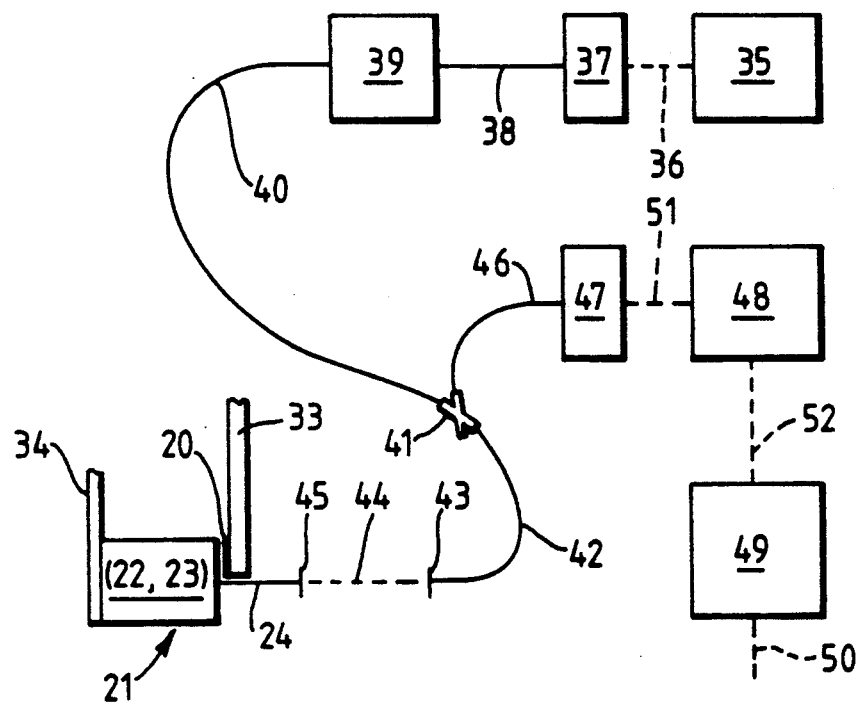
FIG. 4 is a schematic diagram illustrating a first sensor configuration.
Figure 5:
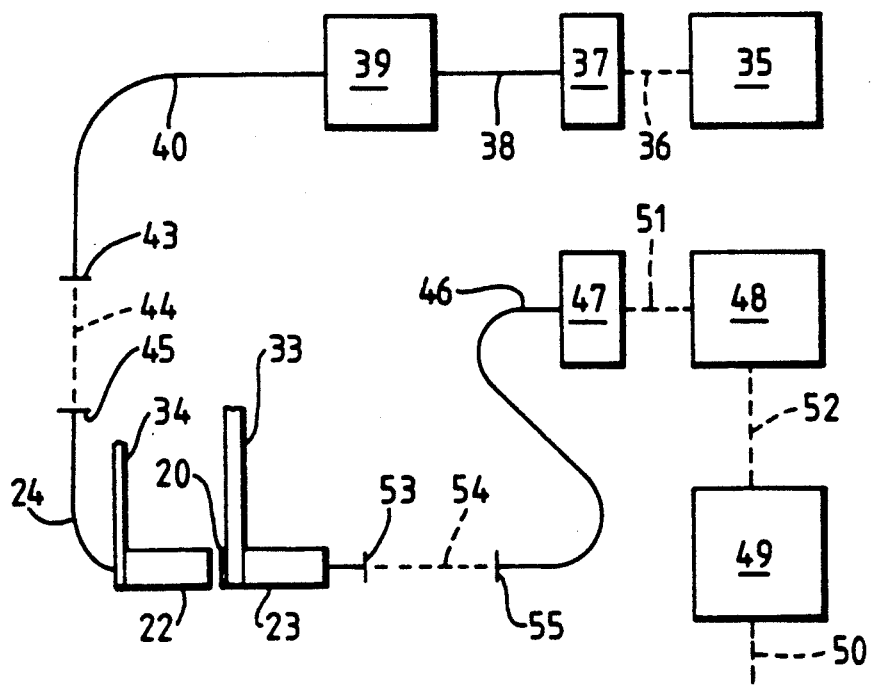
FIG. 5 is a schematic diagram illustrating an alternative sensor configuration.

With reference to FIG. 1, apparatus for sensing the relative movement M of two members comprises an encoded pattern 20 to be carried in any convenient manner by one of the members, and a sensor head 21 to be secured in any convenient manner to the other member. The sensor head 21 comprises a scanning means 22 and a readhead 23, the scanning means 22 being connected to a light input line 24 and being arranged to scan an optical beam 25 transversly in the direction S across the encoded pattern 20 faster than the movement of one increment, whilst the readhead 23 is arranged to receive the optical signal reflected from the encoded pattern 20 and to feed this to a signal output line 26. An unshown optical position sensor, which will be described later with reference to FIGS. 4 and 5, is connected to the signal output line 26 and is arranged to discriminate, from the frequency of the optical signal in the signal output line 26, the position of the readhead 23 relative to the encoded pattern 20. In this manner, the position of the member supporting the sensor head 21 relative to the member carrying the encoded pattern 20 can be determined. Because the position is determined by the frequency of the optical signal in the signal output line 26, rather than the intensity of the light output as hitherto, the replacement of any of the components in the sensor system does not require any calibration.

It should be noted that, whilst the encoded pattern 20 is formed on a glass plate 27 which can be secured in any convenient manner to the appropriate member, the encoded pattern could alternatively be printed or otherwise formed directly on that member.

The encoded pattern 20 can take various forms, but the pattern shown in FIG. 1 comprises an array of alternate equi-spaced light absorbing and light reflecting lines such that the light reflected by the light reflecting lines is collected by the readhead 23. For a constant scan patterns, the received signal will be modulated at a frequency dependent upon the spatial frequency of the reflecting lines. These lines diverge, as illustrated, whereby the reflector spatial frequency varies linearly with the relative movement M to produce a frequency output dependant upon the relative position of the plate 27 to the sensor head 21.

The signal received at the detector $I(t)$ will be modulated at a frequency dependant upon the optical scan function $[X = G(t)]$ and the reflectivity of the reflecting lines $f(x)$ according to the equation $$I(t) \alpha f(G(t)) \tag{1}$$

Figure 2:
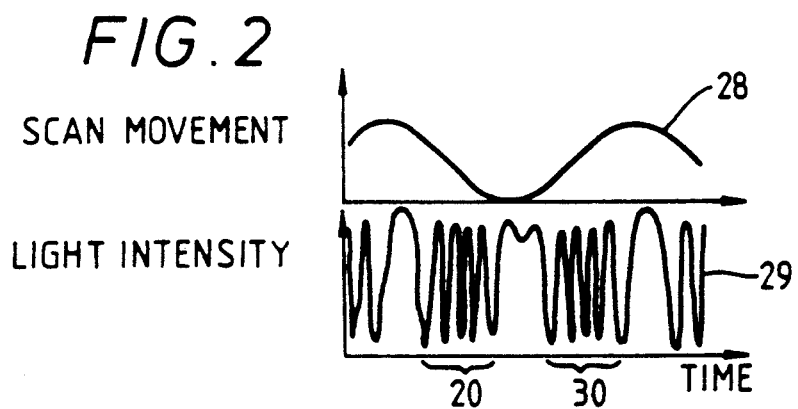
FIG. 2 is a combined graph illustrating the received signal produced by scanning the optical beam sinusiodally across the encoded pattern.
Figure 3:
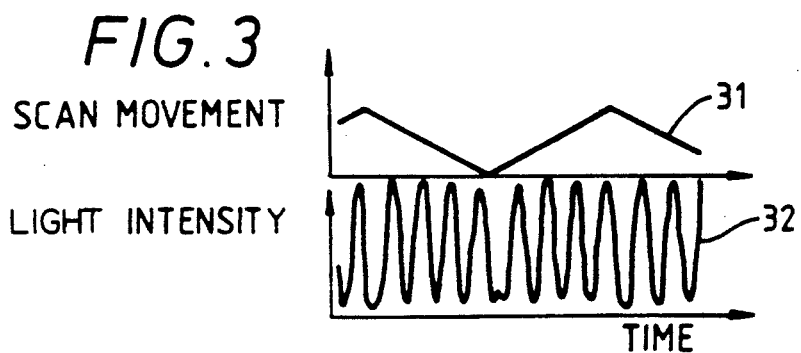
FIG. 3 is a combined graph illustrating the received signal produced by a triangular scan of the optical beam across the encoded pattern.

FIGS. 2 and 3 illustrate experimental results using a piezoelectrically driven mirror to scan the optical beam 25 across the encoded pattern 20 of FIG. 1. In FIG. 2 the scan function G(t) is sinusoidal as indicated at 28 at a frequency of 30 Kilohertz and produces a frequency modulated continuous wave received signal 29 centered at the scan frequency and modulated by the spacial frequency. This gives a sinusoidal reflectivity (f(x)=Asinkx).

In the relative position of the read head 21 shown in FIG. 1, each scan of the optical beam 25 across the four light absorbing lines will produce the five peaks 30 shown in FIG. 2 representing the five reflective bands across which the optical beam 25 has traversed. Thus, if the relative movement M of encoded pattern 20 is normal to the direction of scanning S (as seen in FIG. 1), the frequency of the output signal 26 for each scan of the optical beam 25 is a linear measure of the position of the encoded pattern 20 relative to the readhead 23 and consequently a measure of the relative positions of the members on which they are mounted. It will be noted that the scanning pattern S starts just inside the encoded pattern 20.

The variable spacing of the peaks 30 as seen in FIG. 2 is due to the variation in scanning speed associated with the use of the sinusoidal scan function 28.

FIG. 3 is generally equivalent to FIG. 2 with the exception that the transverse scanning function 31 is triangular and has the advantage of producing a received signal 32 at a single frequency which is easier to analyse as the peaks are equi-spaced. However, the linear scan required by the triangular scanning function 31 is more difficult to produce due to the sudden reversals in the movement of the optical beam 25 at the end of each scan.

With reference to FIG. 4, the encoded pattern 20 is carried by one member 33 whilst the sensor head 21 is carried by the other member 34 whereby the apparatus can be used to sense the relative linear or rotary position of the members 33 and 34. A driver 35 supplies electrical power through an electrical connection 36 to a wideband light source 37 to produce a wideband spectrum of 50 to 100 nanometers. The wideband source 37 can be a matched pair of light emitting diodes.

The wideband spectrum is transmitted through an optical line 38 to a variable centre wavelength optical filter 39 having a small bandwidth of, say 8 to 10 nanometers. The optical filter 39 is scanned across the wideband source to produce a variable wavelength light source which is transmitted to the scanning means 22 within the sensor head 21 through an optical line 40, an X coupler 41, another optical line 42, a connector 43, an optical fibre 44 and a further connector 45 connected to the light input 24. The scanning means 22 within the sensor head 21 incorporates a diffraction grating (in a manner which will be described later with reference to FIGS. 11 and 12) whereby the variation in wavelength in the light input 24 will cause the light reflected by the diffraction grating to be scanned across the encoded pattern 20. The reflected optical signal from the encoded pattern 20 is collected by the readhead 23 within the sensor head 21 and is transmitted back through the light input 24 to the X coupler 41 which splits the return signal so that a proportion thereof is transmitted into an optical line 46 which leads to a detector 47 for amplifying the signal, a demodulator 48 and a frequency discriminator or pulse counter 49 which is arranged to filter the signal to produce an electrical signal output 50 corresponding to the spatial frequency. The detector 47 may be a PIN photo-diode arranged to receive the optical signal from line 46 and to produce a current proportional to the optical power. This varying current would then be converted into a variable voltage transmitted through an electrical connection 51 to the demodulator 48 which is arranged to remove the 30 Kilohertz frequency associated with the scan function to leave a fluctuating output voltage proportional to the residual frequency. This fluctuating voltage is transmitted by a further electrical connection 52 to the frequency discriminator 49.

The sensor configuration just described with reference to FIG. 4 relies on the reflection of light by the encoded pattern 20. However, instead of comprising alternate light absorbing and light reflecting lines, the encoded pattern may instead comprise alternate translucent and light blocking lines with the readhead 23 arranged to receive the optical signal transmitted through the translucent portion of the encoded pattern. Such a construction is illustrated in FIG. 5 in which the same reference numerals utilised in FIG. 4 have been used to denote equivalent components, only the points of difference being now described. The unitary sensor head 21 of FIG. 1 has been split into two components, the scanning means 22 and the readhead 23 which have been repositioned on either side of the encoded pattern 20. The transmitted optical signal collected by the readhead 23 is transmitted via a connector 53 to an optical fibre 54 which is directly connected to the optical line 46 by another connector 55.

The choice between the sensor configurations of FIGS. 4 and 5 will depend on the operational requirements of the apparatus incorporating the relatively movable members 33 and 34. However, in both cases, it will be noted that all connections between the wideband source 37 and the detector 47 are optical and can therefore be arranged in positions which are not guarded against electromagnetic fields, or in which sparks must be avoided. Also that the single optical fibre 44 in FIG. 4, or the two optical fibres 44 and 54 in FIG. 5, enable the few electrical components to be mounted as remotely as may be required from the members 33 and 34 of which the relative positions are to be discriminated or otherwise monitored or measured. The wideband source 37 together with its driver 35 and their associated electrical connection 36 may be screened against electromagnetic fields or placed in a screened position. The detector 47, electrical connection 51, the demodulator 48, the electrical connection 52 and the frequency discriminator or pulse counter 49 can of course be similarly protected.

The encoded pattern 20 illustrated in FIG. 1 can be altered in various ways irrespective of whether it is to comprise alternate light absorbing and light reflecting markings to produce a reflected signal, or alternate translucent and light blocking markings to produce a transmitted signal. For instance, a digital type sensor may be constructed using a encoded pattern which is split into alternate segments to produce signals at different spatial frequencies, one corresponding to digital 0 and the other to a digital 1, thereby achieving a binary output. By splitting the encoded pattern into further segments to produce further spatial frequencies, it is possible to achieve ternary, quaternary and higher order outputs. The pattern may also be split into two or more tracks each having its own readhead 23 thereby producing an absolute encoder. For an n bit absolute encoder a minimum of n readpoints will be required.

Figure 6:
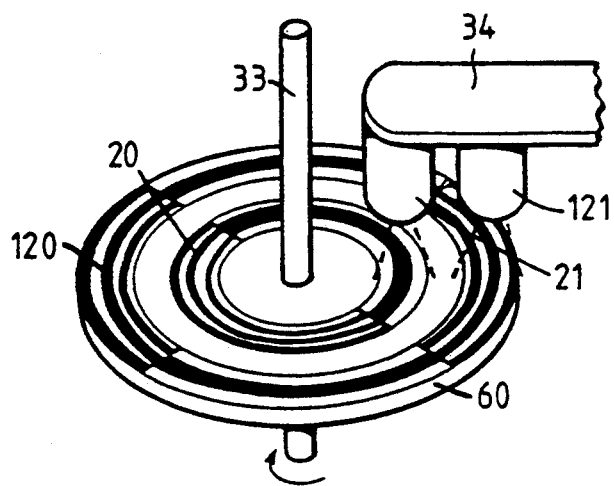
FIG. 6 is a perspective diagram illustrating a 2 bit rotary position sensor.

FIG. 6 shows rotor 60 carrying the encoded pattern which is divided into two tracks 20 and 120. The rotor 60 is mounted for rotation with the one member 33 which is in the form of a rotatable shaft. The other member 34 carries two sensor heads 21 and 121 which are positioned so that their scanning means respectively scan the pattern of tracks 20 and 120 radially as shown, and so that their readheads respectively receive the optical signals reflected from the tracks 20 and 120 to give a discrimation of ±90°.

As the shaft 33 is rotated, so the spatial frequency detected will change. This will not be abrupt due to the finite width of the scanned optical beams and, as the amplitude of one frequency component increases, so the presence of the second will decrease. A switchover point may be achieved by comparing the relative amplitudes of the two components. This method produces a stable edge detector unaffected by the absolute signal power levels.

The advantage of using discrete spatial frequencies and optically scanning perpendicular to the direction of measurement is that, if the spatial frequencies are sufficiently different, small variations in component dimensions due to environmental conditions will not affect the output and a higher resolution sensor may be produced than if the spatial frequency variation and optical scan were along the direction of measurement. (This is analogous to using a digital rotary sensor rather than an analogue device).

If more than two spatial frequencies can be distinguished by a readpoint then fewer readpoints are necessary. The number of readpoints $\Gamma$ required in order to give absolute position to a resolution p using f distinguishable frequencies is given by $$r = \frac{\log P}{\log f} \quad (2)$$

Figure 7:
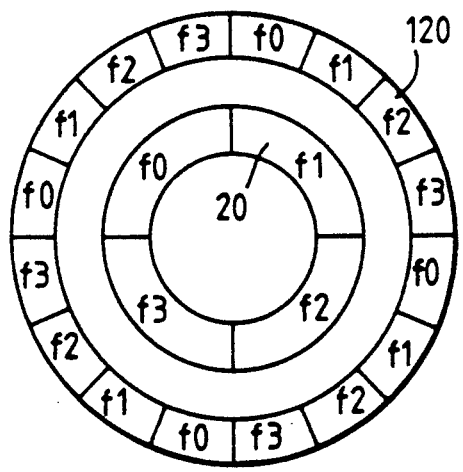
FIG. 7 is a plan view of a rotor divided to give a resolution of 16 using only two tracks and four spatial frequencies.

For example a twelve bit sensor (P=4096) will require twelve readpoints if two frequencies are used or six readpoints if four frequencies are used. By way or example, FIG. 7 shows how a disc may be divided up to give a resolution of sixteen, using only two tracks and four spatial frequencies, $f_0$, $f_1$, $f_2$ and $f_3$, that is a discrimation of ±22½°.

Figure 8:
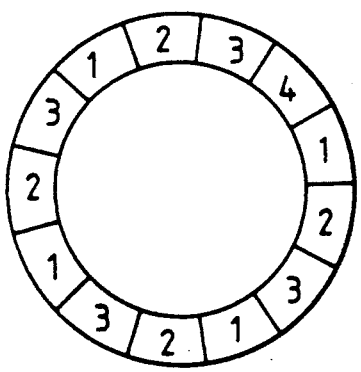
FIG. 8 is a plan view illustrating an incremental rotary device using a single read point and four distinguishable frequencies.

FIG. 8 shows schematically how an incremental device may be produced using a single readpoint and four distinguishable frequencies 1, 2, 3 and 4. Three of the spatial frequencies 1, 2 and 3 repeat along the pattern and a fourth spatial frequency 4 occurs in only one segment to serve as an alignment mark. The three repeating frequencies 1, 2 and 3 are necessary in order to provide direction of movement.

Figure 9:
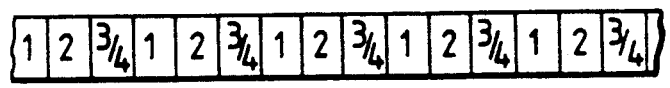
FIG. 9 illustrates a pseudo-random binary sequence sensor using a single read point and four distinguishable frequencies.

FIG. 9 shows how a pseudo-random binary sequence sensor may be constructed again using a single readpoint and four distinguishable frequencies 1, 2, 3 and 4. Each third segment produces either frequency 3 or 4 which occur according to a pseudo-random binary sequence. For example, a ten bit (1024) pseudo-random binary sequence code may be used to produce a sensor with 3072 point resolution. For an N bit pseudo-random binary sequence, N adjacent pseudo-random binary sequence codes are unique and may be used to give absolute position.

Figure 10:
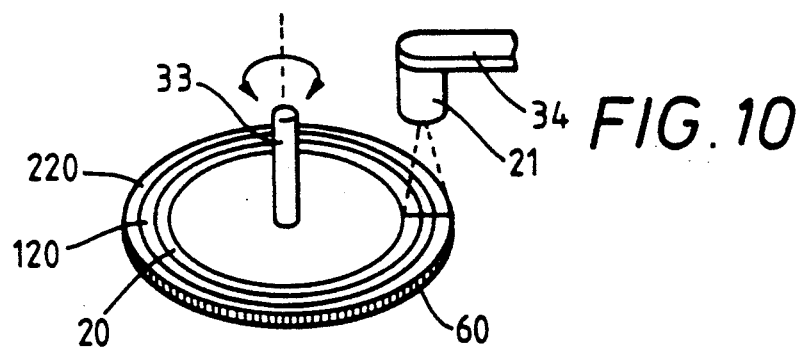
FIG. 10 is a perspective diagram of an alternative rotary sensor in which multiple tracts are scanned and spatial information multiplexed.

A further possible design is shown in FIG. 10 in which a single sensor head 21 scans multiple tracks 20, 120 and 220 each having a different frequency pattern, and the spatial information about segments in different tracks is time multiplexed. The spatial frequencies on different tracks may or may not be the same.

The most suitable sensor configuration will depend upon the sensor application and requirements. The number of frequencies distinguishable will depend upon the scan distance achievable, and the scan rate required.

Figure 11:
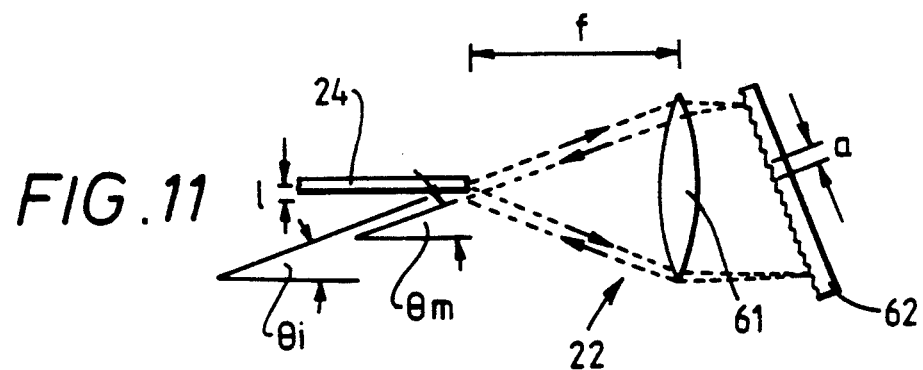
FIG. 11 is a diagram illustrating a means for deflecting light dependent on its wavelength utilising a diffraction lighting arranged in the Littrow configuration.

The scanning means 22 could be operated by utilising travelling fringes, moving speckle patterns or wavelength dependent scanning. The latter technique is the most suitable and FIG. 11 illustrates a wavelength dependent scanning means 22 in which the light input line 24 is associated with a convex collimating lens 61 of focal length F and an inclined diffraction grating 62 having a line spacing a. For a given wavelength $\lambda$ and angle of incidence $\theta_i$, the angle of the diffracted beam will be $\theta_m$ which causes a lateral deflection 1 of the diffracted light. This arrangement of the convex lens 61 and the diffraction grating 62 is known as the Littrow configuration.

The angle of diffraction $\theta_m$ is related to the wavelength $\lambda$ by the equation $$a(\sin\theta_m - \sin\theta_i) = \eta\lambda \quad (3)$$

where $\eta$ is the diffraction order and is an integer. Differentiating equation (3) for a lens of focal length f, the linear variation with wavelength is given by $$\frac{\delta l}{\delta \lambda} = \frac{f \eta}{a \cos \theta_m} \quad (4)$$

Typically, using $a=0.9$ micron, [0=800 nanometers, $f=8$ millimeters, $\eta=1$ then $\delta l/\delta\lambda = 10$ 10 micron/nanometer and for an 80 nanometer wavelength variation a scan distance 1 of 0.8 millimeters may be achieved. This is a small distance and limits both the number of discrete frequencies that may be used and the number of tracks read by each readpoint. It may be increased by using a greater bandwidth source or a larger focal length lens.

Figure 12:
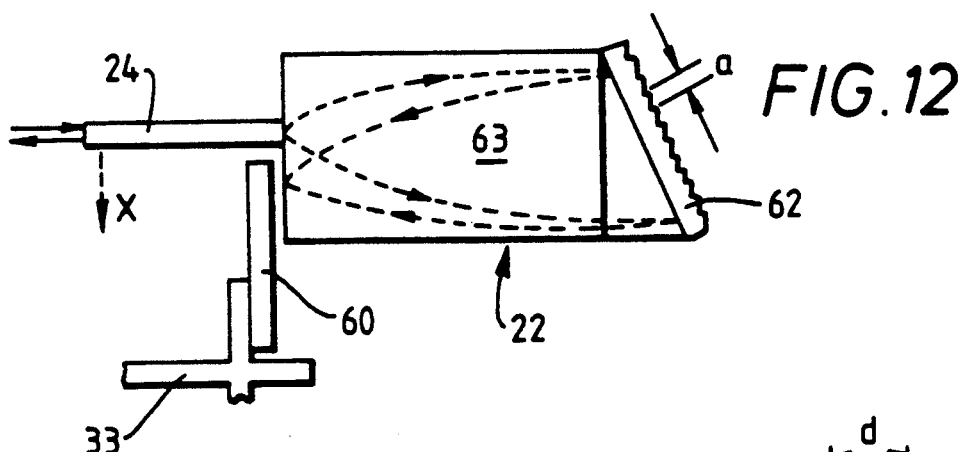
FIG. 12 is a diagram illustrating an alternative means for deflecting the light dependent on its wavelength utilising a gradient index lens.

An alternative to the simple lens approach is to use a gradient index lens 63 as shown in FIG. 12. A gradient index lens uses the variation in refractive index created in the optical material to produce the lensing effect, rather than the surface shape. In this case the linear dispersion is given by $$\frac{\delta \lambda}{\delta l} = n_1 \sqrt{I} \, a \cos (\theta' - \sqrt{I} \, l)$$

where
I is the focussing parameter
$\eta_1$ refractive index of the grating material
$\theta'$ angle of incidence A gradient of 13 micron/nanometer may be achieved using a 1800 line/millimeter grating and a grin lens with 0.0085 millimeter focussing parameter. Similar devices have been reported for use in wavelength division multiplexed sensors in a article "Wavelength Division Multiplexed Digital Optical Position Transducer" by Fritsch K. and Beheim G. published in Optics Letters, Volume 11, No. 1, pages 1-3 in January 1986, and also in an article "High—Capacity Wavelength Demultiplexer with a Large Diameter GRIN Rod Lens" by Metcalf B. D. and Providakes J. F. published in Applied Optics, Volume 21, No. 5, pages 794–796 in March 1982.

Figure 13:
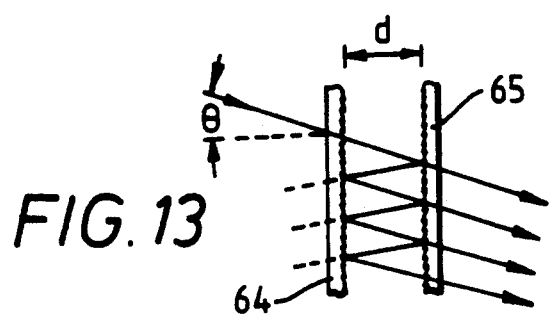
FIG. 13 is a diagram illustrating means for producing a light source of varying wavelength in the form of a Fabry Perot etalon.

To be able to use a wavelength dependent scanning means 22 as just described with reference to FIGS. 11 and 12, it is necessary to produce a controlled variation in the wavelength of the light source, for instance using the optical filter 39 described with reference to FIGS. 4 and 5. However a number of alternative arrangements are possible to produce a controlled variation of wavelength. One such alternative is illustrated in FIG. 13 which shows a multiple beam interference device known as a Fabry Perot etalon. This comprises two mirrors 64 and 65 of which the reflective surfaces face each other and are separated by a very small distance d. The transmitted power $I_T$ is given by $$I_T = \frac{I_o}{1 + F \sin^2 \frac{\delta}{2}} \quad (5)$$

where F is the finesse and is given by $$F = \left(\frac{2r}{1 - r^2}\right)^2 \quad (6)$$

and $r$ is the mirror reflectivity.
The component $\delta$ is given by $$\delta = \frac{4\pi n_i d \cos \theta}{\lambda} \quad (7)$$

where:
  $\eta_i$: refractive index of the internal medium
  d: mirror separation
  $\theta$: angle of incidence
  $\lambda$: wavelength For a 10 nanometer full width half maximum pass band centred at 800 nanometers then a mirror separation of 3.2 micron is required for a finesse of 40. In order to vary the centre wavelength by 80 nanometers, then the mirror separation must change by 320 nanometers, which may be achieved using a piezoelectric drive mechanism.

An alternative solid state solution is to change the refractive index of a liquid crystal type material as disclosed in an article "Continuously Tunable Smetic A* Liquid Crystal Color Filters" by Sharp G. D., Johnson K. M. and Doroski D. published in Optics Letters, Volume 15, No. 10 on pages 523–525 on 15 May 1990, or as disclosed in an article "Fibre Coupled Fabry-Perot Wavelength Demultiplexer" by Mallinson S. R. published in Electronics Letters, Volume 21, No. 3, pages 121–122 in January 1985. A 10% change of index would be necessary and this is achievable with presently available liquid crystals. We have manufactured similar experimental devices for other purposes which are capable of a 50 nanometer centre wavelength variation and a 10 nanometer full width half maximum beam width and operate at a few kilohertz, which has been sufficient for experimental purposes. Much faster liquid crystal filters have been reported by Messrs Sharp, Johnson and Doroski in their above mentioned article, operating at up to 10 megahertz. It is envisaged that the required maximum scan rate for this optical sensor application will be about 10 kilohertz, and this technology should prove suitable for this application. As stated with reference to FIG. 11, the diffraction angle is a function of wavelength. It is also a function of the angle of incidence. Another solution is to rotate the diffraction grating 62, the effect of which can be assessed by differentiating the equation (3) to give $$\frac{\delta \theta}{\delta \lambda} = \frac{m}{a \cos \theta_i} \quad (9)$$

and in the Littrow configuration $\theta_i = \theta_m$, therefore $$\frac{m}{a} = \frac{2 \sin \theta_i}{\lambda} \quad (10)$$

Hence $\quad \frac{\delta \theta}{\delta \lambda} = \frac{2 \tan \theta_i}{\lambda}$ Typically, for $a = 1$ micron, $\lambda = 850$ nanometer, $\theta_i = 23.58°$, then $\delta\theta/\delta\lambda = 1.0$ microradian/nanometer hence for a wavelength change of ±40 nanometers the grating must ±2.35°.

A lens of focal length 6.1 millimeters will focus an 8 nanometer full width half maximum bandwidth beam into a 50 micron core optical fibre. This bandwidth is well within the resolving power of a likely grating, a 1 nanometer resolving power would require a grating of only 1 millimeter in length.

A further solution is to rotate an interference filter. The peak transmission wavelength of interference filters varies, according to an article "Optics Guide 4" in the Melles Griot Optical Catalogue, pages 11.25 to 11.30, by the following equation.

$$\lambda = \lambda_{max} \sqrt{1 - \left(\frac{n_o}{n_e}\right)^2 \sin^2 \phi} \quad (8)$$

where;
  $\phi$ is the angle of incidence
  $\eta_0$ — refractive index of air = 1
  $\eta_e$ — effective refractive index of the filter = 2.1

For a 40° rotation, the peak wavelength of an 800 nanometer filter will vary by about 40. Obviously rotating a filter by such a large angle will result in a fairly low scan rate.

Other possible wavelength variable devices have been considered, such as Bragg cells, variable source drive current and rotating prisms, but there are not capable of such large variations.

Rotating diffraction gratings and Fabry Perot etalons are both capable of providing the required optical wavelength shift of about 80 nanometers. The piezoelectrically driven Fabry Perot and the rotating grating approaches do, however, contain moving parts and their speed of operation is likely to be limited. The solid state solution, using a liquid crystal Fabry Perot etalon, would seem the most attractive in terms of possible speeds measured in kilohertz and lifetime.

Wideband sources with half power bandwidths in excess of 50 nanometers are available from a number of sources and at output powers in excess of 4 milliwatts. Wider bandwidths may be achieved by using a number of slightly different centre wavelength light emitting diodes coupled together. Typically the centre wavelength of a light emitting diode will increase by about 0.2 nanometers/° C. This will result in a centre frequency change of about 20 nanometers between 25° and 125° C. Provided the optical source spectrum is wide enough this will not affect the sensor output as the wavelength actually used by the sensor is dependant upon the variable optical filter and it is the effect of temperature on the Fabry Perot etalon that is of more importance.

The optical fibre size used within the sensor will have a number of important effects on the encoder design—greater optical powers can be inserted into larger core fibres and hence will produce a greater signal to noise ratio. Typically 30 microwatts may be inserted into 50/125 micron fibre, compared to 165 microwatts into 100/140 micron fibre or 900 microwatts into 200/300 micron fibre.

The beam size formed on the encoded pattern will be approximately the same size as the fibre core diameter unless masking is used. This will restrict the minimum reflector linewidth possible to that of about the fibre core diameter. For a fixed scan length the maximum number of reflective stripes that may be scanned will be reduced for a larger core fibre and the number of discrete frequencies detectable will be reduced. The larger beam size also limits the minimum bit length, hence sensors using smaller fibre will give a higher resolution.

Smaller diameter optical fibres may be bent into smaller radius curves enabling the overall sensor package to be kept small and allowing more choice as to the external connections to the device.

Obviously the most suitable fibre will depend upon the available optical fibre as well as the required sensor characteristics. However, optical fibres of between 300 and 100 microns are suitable.

Over the short lengths of optical fibre likely to be used in sensor applications, the normal optical losses are negligible.

The detectors 47 described with reference to FIGS. 4 and 5 are preferably PIN photo-diodes to match the light emitting diodes used as the wideband source 37. These photo-diodes would typically need sub nanowatt sensitivity at frequencies up to about 100 kilohertz. Such photo-diodes will operate at temperatures in excess of 120° C., but with a dark current that increases by about 10%/° C.

Optical fibre couplers typically have a 0.5 decibel excess loss over their full temperature range (0°-70° C. at present) and are available at whatever splitting ratio is required. For this application a 50:50 split is suitable.

Figure 14:
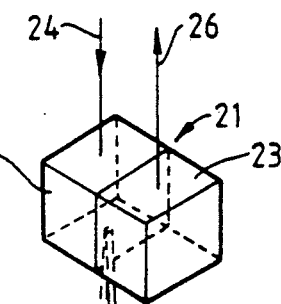
FIG. 14 is a diagram similar to FIG. 1 but illustrating the use of an encoded binary pattern.
Figure 15:
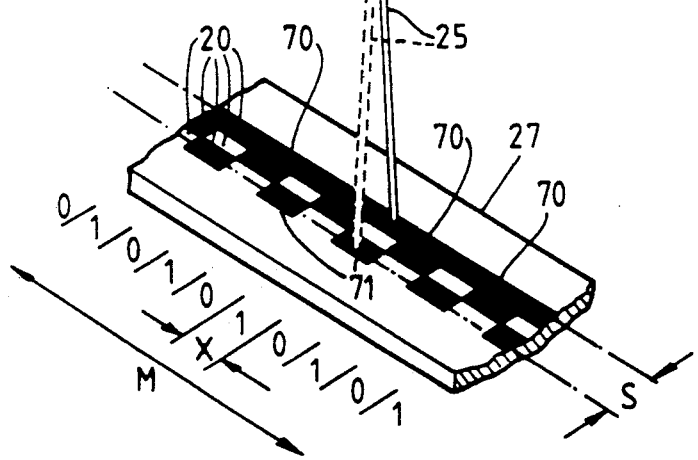
FIG. 15 illustrates a modification of the encoded pattern shown in FIG. 14 to produce a quaternary signal.
Figure 16:
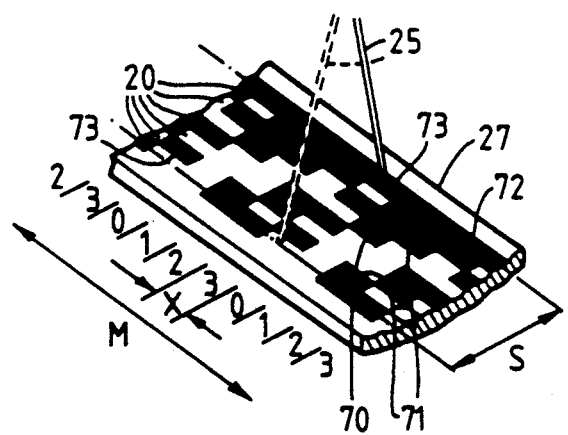
FIG. 16 illustrates a modification of the encoded pattern shown in FIG. 1.
Figure 16:
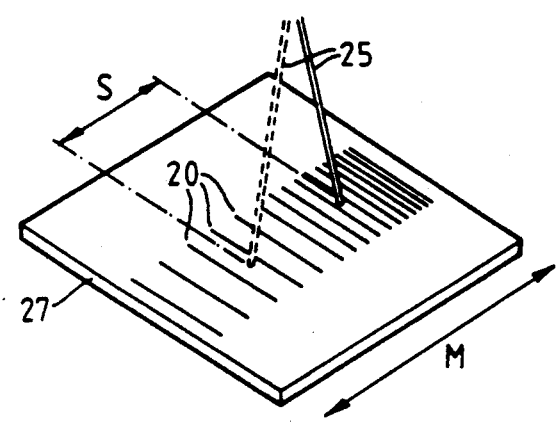

FIGS. 14, 15 and 16 all show variations of the arrangement already described with reference to FIG. 1 and accordingly the same reference numerals are used to denote equivalent features and only the points of difference are described.

In FIG. 14 the encoded pattern 20 is movable in the direction M at right angles to the scanning movement S of the optical beam 25 and comprises alternate patterned bands 70 and 71. Each band 71 has two spaced light absorbing lines as shown, whilst each band 70 has only one. The frequency produced by movement of the optical beam 25 across any of the bands 70 is detected as a binary 0 and the frequency of any of the bands 71 is detected as a binary 1 whereby the frequency varies digitally with the relative movement M. The width of the bands 70, 71 is X, as shown, which is the increment of movement detectable and may be of the order of fifty microns.

In FIG. 15 the encoded pattern comprises four differently patterned bands 70, 71, 72 and 73 respectively having one, two, three and four light absorbing lines. This arrangement provides a quaternary read-out with the bands 70 signifying 0, the bands 71 signifying 1, the bands 72 signifying 2 and the bands 73 signifying 3.

In FIG. 16 the relative movement M is in the same direction as the scanning movement S of the optical beam 25. However the encoded pattern 20 is in the form of a series of parallel light absorbing lines arranged with progressive pitch variation as shown to give frequency modulation dependant on the portion of the encoded pattern 20 scanned by the optical beam.

The signal processing electronics will consist of a signal detection and amplification unit 47, frequency modulation (if the scanned beam is sinusoidal in nature), and a frequency analyser to identify the spatial frequency present. If more than one spatial frequency is present (i.e. the readpoint is on the transition between one bit and the next) then a comparison of the relative amplitudes will be made, the position being given by the spatial frequency with the greatest amplitude.

The frequency based optical fibre sensor taught by the present invention is inherently self testing. If one of the spatial frequencies is present in the output then the sensor is operating correctly. If the frequency is not present then it is not operational.

An indication of any long term drift and the subsequent need for replacement of the sensor may be achieved by analysing the signal amplitude. Assuming a long term degradation, the signal amplitude will gradually fall indicating a likely future failure.

With avionics applications it should be noted that the minimum resolution is dependant upon the size of the optical beam incident upon the encoded pattern. This will typically be slightly smaller than the optical fibre core diameter. Typically the minimum distance detectable using 100/140 micron fibre will be about 80 micron and 40 micron for 50/125 micron fibre. Hence, a twelve bit (4096) sensor will have a diameter of approximately 100 millimeters in rotary form and will be approximately 300 millimeters long in its linear form, using 100/140 micron fibres and 55 millimeter diameter and 160 millimeter long respectively for 50/125 micron fibres. Greater resolutions, and hence smaller sensors sizes, may be achieved using a number of techniques including masking.

The number of optical fibres required will depend upon the type of sensor, the resolution and the number of discrete frequencies available. For an incremental sensor only one optical fibre should be necessary. Similarly, for a pseudo random binary sequence encoder (essentially an incremental encoder with many alignment marks) only one readpoint, and hence one fibre, is required. For an absolute encoder, say twelve bits and using four spatial frequencies, six readpoints and hence six fibres will be necessary. If more frequencies may be resolved or more than one track read by a readpoint, then less fibres will be necessary.

All the components operate at low voltages (less than 15 volts) and current. The total power consumption of the sensor is typically less than 1 watt.

In the case of optical fibre sensors, the avionics temperature requirement is probably the most difficult to meet. Variations in temperature can generally affect the alignment of the optical components resulting in a variation in signal intensity. For a frequency based sensor, variations in signal intensity are less important and it is variations in components which affect the frequency of the signal that must be considered. In this case variations may be caused by a number of factors including expansion in the reflective disc, scan distance variation caused by the diffraction grating, and scan distance variations caused by the Fabry Perot etalon.

Expansion in the reflective disc will have little affect on the actual reflector spatial frequency due to its small size (less than 1 millimeter). However, it may cause some axial misalignment and it is important that the reflective pattern is designed to cover a greater width than the nominal scan pattern length such that any relative movement will not cause the scan to miss the reflectors.

An increase in temperature of the diffraction grating will result in an increase in the grating line spacing which will reduce the diffraction angle for a given wavelength resulting in a shorter scan. From equation 4 the dispersion of a grating is given by:

$$\frac{\delta l}{\delta \lambda} = \frac{fn}{a \cos \theta_m} = D \quad (11)$$

and the dispersion will vary with diffraction grating spacing $a$ according to:

$$\frac{\delta D}{\delta a} = \frac{fn}{a^2 \cos \theta_m} \quad (12)$$

also $\delta a = dT l_T a \quad (13)$ where dT is the temperature change and $l_T$, the coefficient of thermal expansion. Combining equations 12 and 13 gives:

$$\frac{\delta D}{\delta T} = \frac{fn l_T}{a \cos \theta_m} \quad (14)$$

Dividing 14 by 10 gives $$\frac{\delta D}{D} = l_T dT \quad (15)$$

and for a thermal coefficient of expansion of $2 \times 10^{-5}/°$C. and temperature change of 100° C. then the optical scan width will vary by only 0.2%. A variation of greater than 10% would be required depending upon the electrical filter bandwidths in order to produce a positional error.

Temperature variations to the Fabry Perot etalon will affect the peak transmitted wavelength for a given applied voltage. It will have little effect upon the actual bandwidth. Hence, provided the source is of a sufficiently wide bandwidth, the etalon will produce a similar wavelength sweep, but at a different central wavelength. This will result in the scan on the disc being spatially shifted but of approximately the same length which will have little effect on the output signal frequency.

When vibrated, optical fibres modulate the intensity of any light travelling through them—this is the principle of the microbend type sensor. The vibration frequency will generally be below a few kilohertz and above that the effect will be small. By ensuring that the Fabry Perot modulation frequency is well above these vibration frequencies signal disruption may be minimised.

Similarly aircraft vibration may cause the glass plate to dither across an edge between two positions. Provided the vibration frequency is less than the scan rate then this effect should not cause any problems.

What is claimed is:

1. Position sensing apparatus, for sensing the relative position of two members, including an encoded pattern carried by one of said members, means for producing an optical beam of varying wavelength, scanning means for deflecting said beam dependent on its wavelength to scan over said encoded pattern, said encoded pattern being arranged to transmit part of said beam as an optical signal, a readhead secured to said other member to receive said optical signal and an optical position sensor to receive said optical signal from said readhead and to discriminate, from the frequency of said optical signal, the position of said readhead relative to said encoded pattern and consequently the relative position of said members.

2. Position sensing apparatus as in claim 1, in which said readhead incorporates said scanning means.

3. Position sensing apparatus as in claim 1, in which said scanning means includes a diffraction grating for deflecting the beam dependent on its wavelength.

4. Position sensing apparatus as in claim 3, in which said diffraction grating is arranged in the Littrow configuration.

5. Position sensing apparatus as in claim 3, in which said diffraction grating is combined with a gradient index lens.

6. Position sensing apparatus as in claim 1, in which said means for producing the optical beam of varying wavelength includes a wideband light source governed by a variable wavelength filter.

7. Position sensing apparatus as in claim 6, in which said variable wavelength filter is a multiple beam interference device.

8. Position sensing apparatus as in claim 7, in which said multiple beam interference device is a Fabry Perot etalon.

9. Position sensing apparatus as in claim 8, in which said etalon is arranged to be piezoelectrically driven.

10. Position sensing apparatus as in claim 8, in which said etalon is a solid state device including a variable refractive index liquid crystal.

11. Position sensing apparatus as in claim 6, in which said variable wavelength filter is a rotatable diffraction grating.

12. Position sensing apparatus as in claim 6, in which said variable wavelength filter is an interference filter.

13. Position sensing apparatus as in claim 1, in which said scanning means is arranged to move said optical beam sinusoidally.

14. Position sensing apparatus, as in claim in which said encoded pattern varies in regular increments in the direction or sense of movement between said two members, and said scanning means is arranged to scan said optical beam transversely to such direction or sense of movement.

15. Position sensing apparatus as in claim 14, in which successive increments of said encoded pattern are arranged to transmit optical signals of different frequency to said readhead.

16. Position sensing apparatus as in claim 15, in which said encoded pattern includes an increment which is arranged to transmit a unique light signal to said readhead to serve as a reference point.

17. Position sensing apparatus as in claim 1, including a second encoded pattern to be carried by the said one member, means for producing a second optical beam of varying wavelength, a second scanning means for deflecting said second beam dependent on its wavelength to scan over said second encoded pattern, and a second readhead to be secured to the said other member, the said two encoded patterns being different to assist said optical position sensor to discriminate more finely the position of said readhead relative to said encoded patterns.

18. A method of sensing the relative position of two members, including providing an optical beam of variable wavelength, refracting the beam dependent on its wavelength to scan, from a fixed position relative to one of said members, over an encoded pattern carried by the other of said members to produce an optical signal, and detecting the portion of said encoded pattern over which the optical beam has been scanned by sensing the frequency of the optical signal.

19. A method as in claim 18, additionally including passing a wideband light source through a variable wavelength filter to produce said optical beam of variable wavelength.

* * * * *